United States Patent [19]
Tabata et al.

[11] 4,401,984
[45] Aug. 30, 1983

[54] ELECTROCHROMIC DISPLAY DEVICE

[75] Inventors: Junichi Tabata; Noboru Kaneko, both of Tokyo, Japan

[73] Assignee: Kabushiki Kaisha Daini Seikosha, Tokyo, Japan

[21] Appl. No.: 196,119

[22] Filed: Oct. 10, 1980

[30] Foreign Application Priority Data

Oct. 15, 1979 [JP] Japan .................. 54/132605

[51] Int. Cl.³ .............................. G09G 3/34
[52] U.S. Cl. .................... 340/785; 340/763; 340/811; 350/357
[58] Field of Search ............ 340/763, 785, 805, 811; 350/357, 363

[56] References Cited
U.S. PATENT DOCUMENTS

| | | | |
|---|---|---|---|
| 4,092,637 | 5/1978 | Barclay et al. | 340/785 |
| 4,181,406 | 1/1980 | Kohara et al. | 350/357 |
| 4,205,903 | 6/1980 | Inami et al. | 340/785 |
| 4,229,080 | 10/1980 | Take et al. | 350/357 |
| 4,242,681 | 12/1980 | Tabata | 340/785 |
| 4,256,380 | 3/1981 | Barclay et al. | 340/785 |

*Primary Examiner*—Marshall M. Curtis
*Attorney, Agent, or Firm*—Robert E. Burns; Emmanuel J. Lobato; Bruce L. Adams

[57] ABSTRACT

An electrochromic display device has an electrolyte contained between two spaced-apart substrates. A set of display elements including first and second display elements are disposed on the surface of at least one of the substrates in contact with the electrolyte, and a counter electrode is disposed on the surface of the other substrate in contact with the electrolyte. Each of the display elements comprises a transparent electrode and an electrochromic layer disposed on the transparent electrode such that the display element exhibits either colored or bleached states depending on the amount of electric charge held by the display element. A charge transfer voltage is selectively applied between preselected bleached and colored display elements to effect transfer of electric charges through the electrolyte to thereby change the display state. Deterioration of the coloration exhibited by the colored display elements is compensated by applying a constant voltage between the first display element and the counter electrode, the value of the constant voltage being lower than that of the charge transfer voltage, and control circuitry controls the application of the constant voltage such that the constant voltage is applied before each predetermined number of transfers of electric charge held by the first display element to the second display element thereby maintaining the degree of coloration of the colored display elements.

10 Claims, 12 Drawing Figures

THE NUMBER OF TRANSFERS

ELECTROCHROMIC DISPLAY DEVICE

BACKGROUND OF THE INVENTION

The present invention relates to an electrochromic display device (referred to as an ECD hereafter). More particularly, the present invention relates to a refreshing method exhibiting a uniform coloration degree in an ECD driven by transferring a coloration electric charge held in an electrode group in a colored state to an electrode group in a bleached state, by applying a voltage between the electrode group in the colored state and the electrode group in the bleached state (referred to as an electric charge transfer drive). The ECD driven by the electric charge transfer exhibits excellent uniformity in display color and a quick response.

SUMMARY OF THE INVENTION

It is an object of the present invention to eliminate the drawbacks of prior art electrochromic display devices and to prevent the deterioration of the coloration degree whenever the electric charge transfer exceeds a predetermined number.

It is another object of the present invention to provide an electrochromic display device having a group of display elements comprised of a transparent electrode and an electrochromic layer on the transparent electrode, a counter electrode on a substrate counter to the display elements, means for applying a constant voltage between the display element in a colored state and a counter electrode, and means for determining the timing of the application of the constant voltage and for transferring electric charge held in the display element in a colored state to a display element in a bleached state.

DETAILED DESCRIPTION OF PREFERRED EMBODIMENTS

Figure 1:
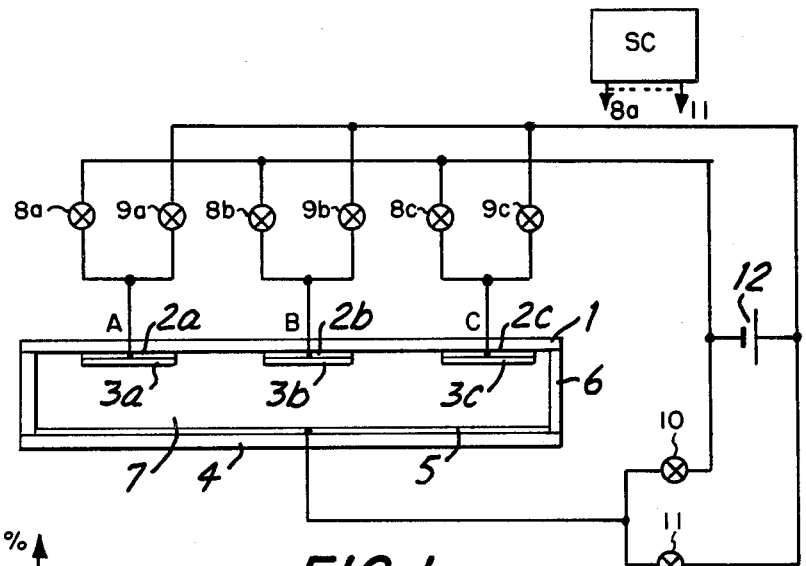
FIG. 1 shows an ECD for illustrating the fundamental principle of an electric charge transfer system.

In the ECD panel shown in FIG. 1, transparent electrodes $2a$ to $2c$ are formed on a plane of a transparent substrate 1 being which is in contact with an electrolyte 7 by evaporating $In_2O_3$ or the like, and electrochromic thin films $3a$ to $3c$ are formed on the respective transparent electrodes $2a$ to $2c$ in the configuration of display picture elements by evaporating $WO_3$ or $MoO_3$.

Though omitted in FIG. 1, the transparent electrode portion other than the display picture element pattern region, i.e., other than the electrochromic thin films $3a$ to $3c$, is covered with an insulating film. The transparent electrodes $2a$ to $2c$ and the films of electrochromic material $3a$ to $3c$ jointly define display elements A to C. The electrolyte 7 is sealed within spacers 6 placed between the substrate 1 and a substrate 4 on which a counter electrode 5 formed of Au or the like is provided. The electrolyte is mixed with a white powder such as $TiO_2$ to constitute a background of the display.

Referring to the circuit portion, coloration switches $8a$ to $8c$ respectively connect each of the transparent electrodes $2a$ to $2c$ to the cathode of a battery 12. Bleaching switches $9a$ to $9c$ respectively connect each of the transparent electrodes $2a$ to $2c$ to the anode of the battery 12. A switch 10 for eliminating the coloration electric charge connects the counter electrode 5 to the cathode of the battery 12. A switch 11 for injecting the coloration electric charge connects the counter electrode 5 to the anode of the battery 12. In operation, the battery 12 applies a voltage (referred to as a "charge transfer voltage") between preselected bleached and colored display elements to effect transfer of electric charges between the preselected display elements through the electrolyte to change the state of the display.

Now the operation of the ECD by the above described structure will be illustrated.

The coloration electric charge is initially injected into the ECD panel. The electrode to which the coloration electric charge is injected initially is designated as the display electrode A. When the switch $8a$ and the switch 11 are closed, a current flows from the counter electrode 5 to the display element A, and the film of the electrochromic material $3a$ is deoxidized and colored. In case the switches $8a$ and 11 are opened when the film of the electrochromic material $3a$ gets to the predetermined coloration degree, the electrochromic material $3a$ holds the deoxidization state and the display memorizes the coloration state.

Referring now to the method of the electric charge transfer, the coloration electric charge held in the display element A is transferred to the display electrodes C by closing the switches $9a$ and $8c$ and connecting the anode of the battery 12 to the display element A and connecting the element of the battery 12 to the display element C. The battery 12 thus applies a charge transfer voltage between the display elements A and C so that the coloration electric charge is released from the display element A, transferred through the electrolyte 7 and injected to the display element C. As the result, the display element A changes from the colored state into the bleached state and a display element C assumes the colored state and the display state changes.

The above noted electric charge transfer drive is disadvantageous in that the coloration degree deteriorates in accordance with an increase in the number of transfers, since a slight transfer loss exists in the electric charge transfer process.

Figure 2:
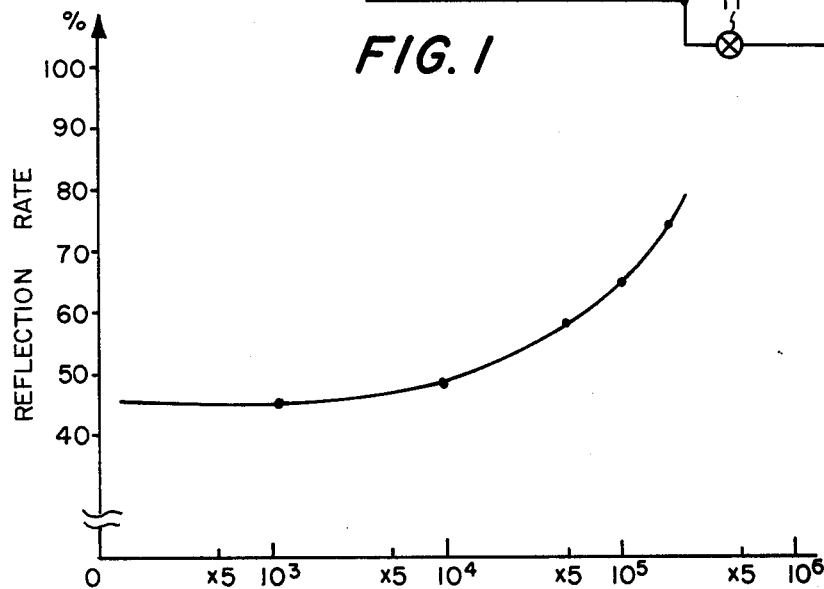
FIG. 2 shows the relation between the number of transfers and the reflection rate.

FIG. 2 shows experimental data of the coloration degree and the number of transfers. The ordinate indicates a reflection rate of the display portion and the abscissa indicates the number of transfers in FIG. 2. The white background is the standard of 100% reflection rate, and the more the coloration degree, the less the reflection rate. FIG. 2 teaches that the coloration degree is substantially constant until the number of transfers is $10^3$ times, and thereafter the coloration degree abruptly deteriorates. Therefore a difference in the coloration degree, i.e., a color shading develops between the display electrode group undergoing a large number of electric charge transfers and the display electrode group undergoing a small number of the electric charge transfers, or the coloration degree of the display gradually deteriorates as a whole.

Hereinafter the present invention will be illustrated in conjunction with the drawings.

Figure 3A:
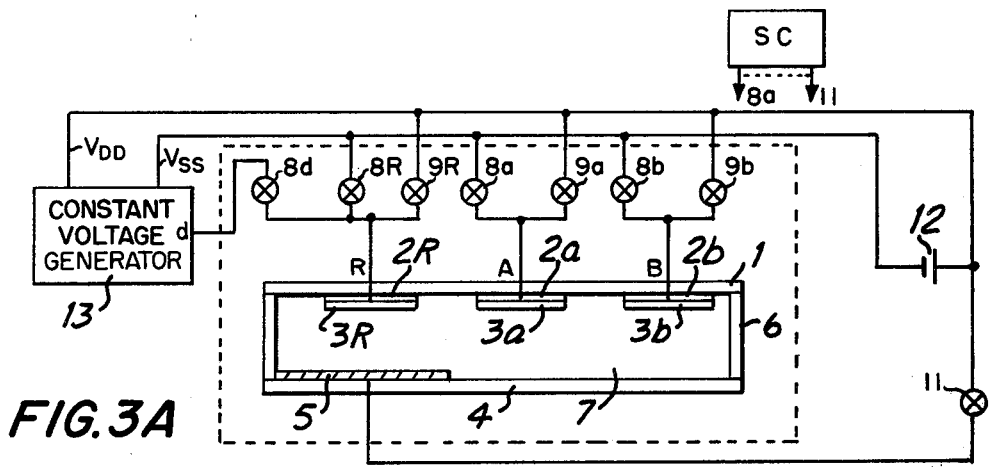
FIG. 3A shows an ECD provided with a dummy element serving as a refresh element according to the present invention.

FIG. 3A shows an ECD provided with a refresh element according to the present invention. In FIG. 3A, the same parts as shown in FIG. 1 are designated by the same references as that of FIG. 1 and the description of such parts will therefore be omitted.

A refresh element R consists of a transparent electrode 2R on a plane of the transparent substrate 1 which is in contact with the electrolyte 7 and a film of electrochromic material 3R is provided on the transparent electrode 2R. It is desirable for prolonging the life of display that the material of the transparent electrode 2R and the film of the electrochromic material 3R are the same as the material of the transparent electrodes 2a, 2b and the film of the electrochromic materials 3a and 3b.

The refresh electrode according to the present invention consists of the transparent electrode and the electrochromic material made of the same material as the display electrode group.

In FIG. 3A, numeral 13 designates a constant voltage generator using the power source 12 as the source voltage of the circuit and the generator 13 produces a negative constant voltage at an output terminal d using the plus potential $V_{DD}$ of the power source 12 as a ground potential. The output terminal d is connected to the refresh element R via a refreshing switch 8d. The refresh element R is connected to the plus terminal of the power source via the switch 9R and to the minus terminal of the power source via the switch 8R and is called a dummy element since the electrode R does not serve directly as the electrode for displaying information.

The constant voltage generating circuit 13 is capable of producing an arbitrary negative constant voltage lower than the source voltage by changing the circuit constant.

The refreshing method of the ECD of the above described structure will now be illustrated.

The refresh of the coloration electric charge of the display element A is as follows:

(1) By the control of the switch control circuit SC, the switches 9a and 8R are closed at the time the display element A is to be bleached to transmit the coloration electric charge on the display element A to the refresh element R. As a result the display element A is placed in the bleached state.

(2) The switches 9a and 8R are opened to memorize the coloration electric charge on the refresh element R.

(3) The switches 8d and 11 are closed to inject the coloration electric charge corresponding to the predetermined coloration degree to the refresh element R. After this the switches 8d and 11 are opened.

(4) The switches 8a and 9R are closed at the time the display element A is to be colored to transmit the coloration electric charge on the refresh element R to the display element A.

The refresh of the coloration electric charge on the display element A is finished by the above (1) through (4) operations.

Although the coloration electric charge restored to the display element A after refreshing has been illustrated so far, the coloration electric charge may be transmitted to the other display element B which changes from the bleached state to the colored state.

Figure 3B:
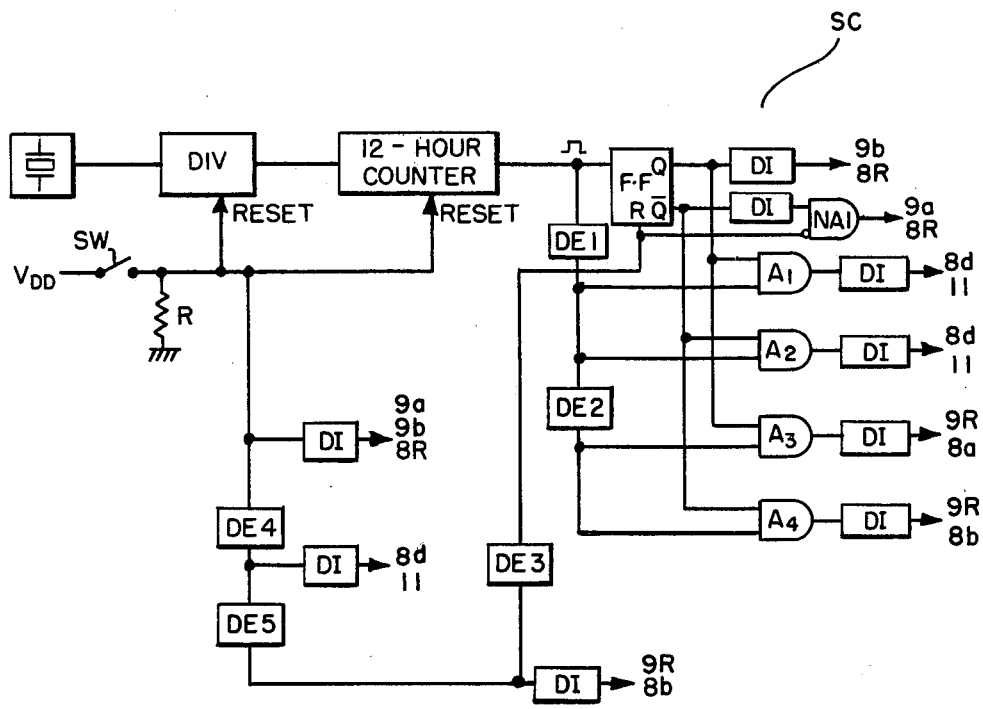
FIG. 3B shows a switch control circuit of an ECD shown in FIG. 3D.
Figure 3C:
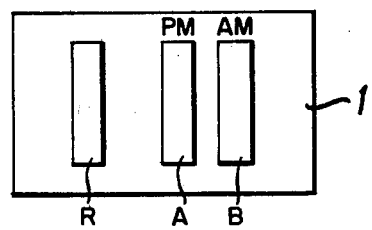
FIG. 3C shows a plan view of an ECD shown in FIG. 3D.
Figure 3D:
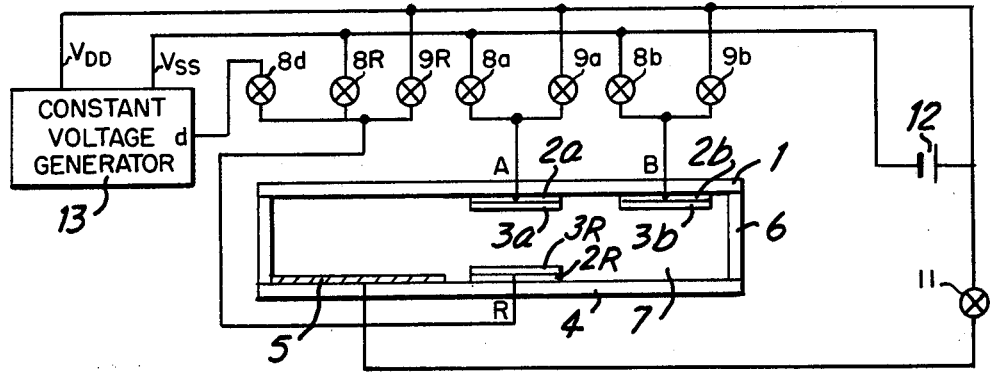
FIG. 3D shows an ECD provided with a dummy element serving as a refresh element on the substrate of a counter electrode according to the present invention.

FIG. 3B is a switch control circuit SC for switching the switches 8a–11 of the ECD shown in FIG. 3D and FIG. 3C is a plan view of the ECD in FIG. 3D. The display elements A and B are, for example used for displaying "AM" and "PM".

When the electrochromic material 3a is in the colored state, the user knows that the present time is "PM". On the other hand, when the electrochromic material 3b is in the colored state, the user knows that the present time is "AM".

The switches 9a, 9b and 8R switch to the ON state by the signal through the differentiation circuit DI for wave-forming when the reset switch SW is closed during the period of the signal. At the same time, the divider DIV and 12-hour-counter are reset. The switching signal of the reset switch SW passes the delay circuit DE4 the output signal of which is wave-formed by the differentiation circuit DI and makes the switches 8d and 11 closed.

As a result, the coloration electric charge is refreshed by flowing a current between the counter electrode 5 and the refresh element R. The refresh element R is formed on the substrate 4 counter to the substrate 1 so that the coloration of the electrochromic material 3R cannot be seen from the upper direction.

The output signal of the delay circuit DE5 is wave-formed by the differentiation circuit DI so that the switches 9R and 8b become in the ON state and the coloration electric charge is transferred to the electrochromic material 3b. As a result, the display element B for indicating "AM" is changed to the colored state.

Then the flipflop circuit F.F connected to the 12-hour-counter is reset by the output signal of the delay circuit DE3. After being reset, the 12-hour-counter produces a 12-hour pulse from the output thereof when the 12-hour-counter counts the pulses corresponding to 12 hours. The Q terminal of the flip-flop circuit F.F becomes "1" level and the switches 9b and 8R are closed so that the coloration electric charge is transferred to the electrochromic material 3R.

Then, the output signal of the delay circuit DE1 becomes the output signal of the AND circuit $A_1$ so that the switches 8d and 11 are switched to the ON state for refreshing the coloration degree. And then, the switches 9R and 8a are switched to the ON state for indicating "PM".

The flipflop circuit F.F changes the output state thereof when it counts the pulses corresponding to 12 hours. The display element A having the transparent electrode 2a and the electrochromic material 3a is colored for indicating "AM" after the refreshing operation.

Figure 3E:
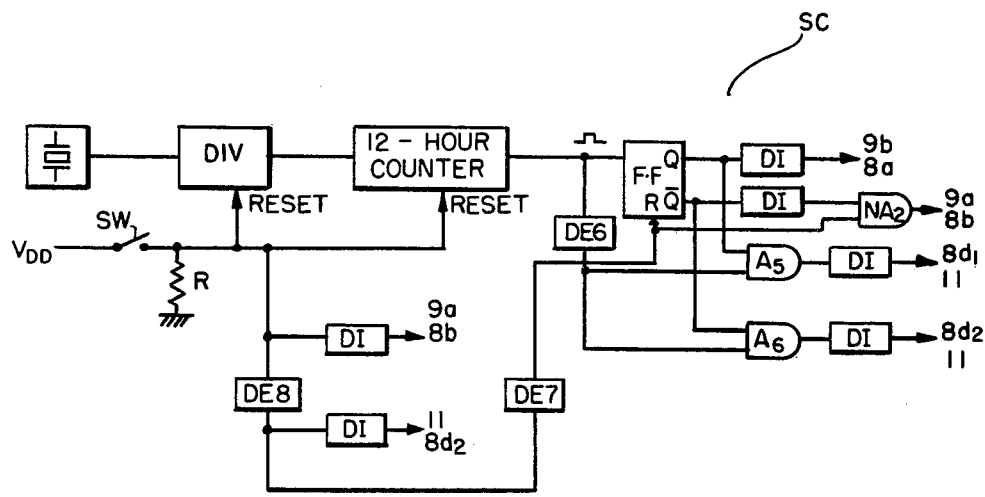
FIGS. 3E, 3F and 3G show a switch control circuit, an ECD without a dummy element, and a plan view of the ECD of FIG. 3F.
Figure 3F:
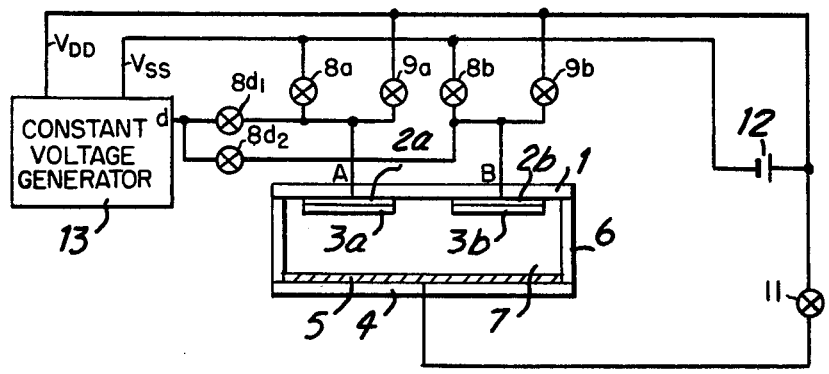
Figure 3G:
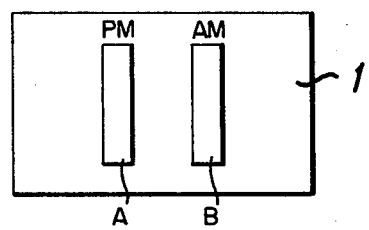

FIGS. 3E, 3F and 3G show a switching control circuit SC for switching the switches 8a–11 of an ECD shown in FIG. 3F, the ECD and a plan view of the ECD respectively.

The ECD of FIGS. 3F and 3G does not use the refresh element R shown in FIGS. 3C and 3D. Instead, the refreshing operation is executed by either the application of the constant voltage between the display element A and the counter electrode 5, or the application of the constant voltage between the display element B and the counter electrode 5.

Hereinafter a method to set the coloration degree during the refreshing according to the present invention will be illustrated.

In the afore-described explanation of operation step (3) of the refreshing operation, if the injecting period is set sufficiently long, the injection of the electric charge stops where the negative electromotive force generated in the refresh element R comes into balance with the negative constant voltage output of the constant voltage generator 13. Consequently the coloration electric charge maintained in the refresh element is always constant.

The amount of the coloration electric charge can be controlled by changing the constant voltage level. According to experiment, when the area of the refresh element equals the area of the display element, about 0.85 mm$^2$, if the refresh is carried out by the constant voltage of $-0.5$ V, the coloration degree is controlled at 45% reflection rate for about 10 seconds.

In the above refreshing method, an arbitrary coloration degree can be obtained by changing the negative constant voltage level applied to the refresh element and the coloration electric charge can always be refreshed at a constant coloration degree.

Figure 4:
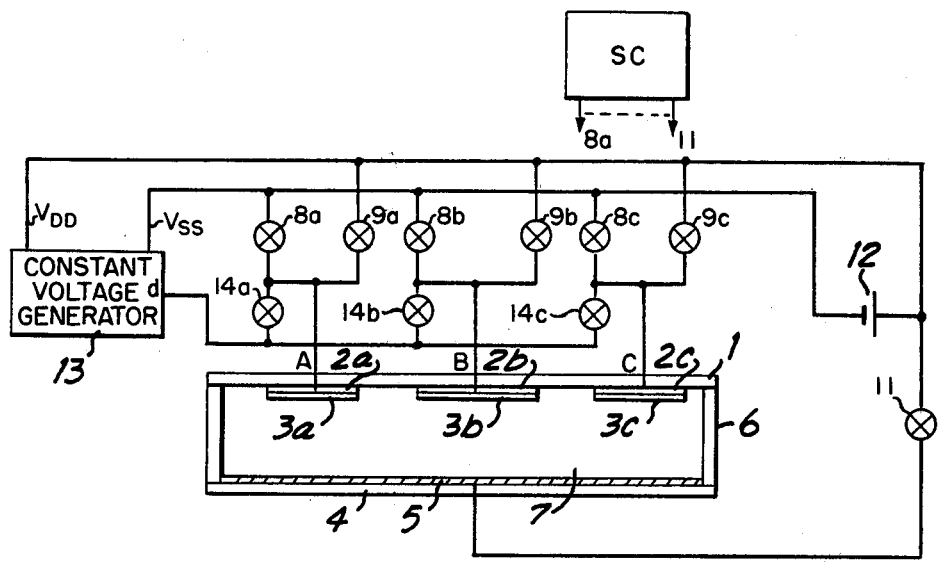
FIG. 4 shows another ECD according to the present invention.

Now another refresh operation will be described according to FIG. 4. In FIG. 4, 14a, 14b and 14c are refresh switches respectively. The refresh operation is executed by refreshing the display elements in the colored state using a sampling operation. The display electrode group in the colored state, i.e., the state of the display element group from the finishing state of one display change to the starting state of the next display change, is in a memory state in which the display element group is disconnected from the battery 12. During the memory period, all of the display elements in the colored state, for example the display elements A and B, are connected to the negative terminal d of the constant voltage generator 13 by the control of the switch control circuit SC. The switch control circuit SC may be a divider and decoder for an electronic timepiece if the electrochromic display is used for the electronic timepiece. At the same time, the counter electrode 5 is connected to the anode of the battery 12 by the control of the switch control circuit SC.

According to the above refresh operation, the refresh element R as shown in FIG. 3 is not required.

Figure 5:
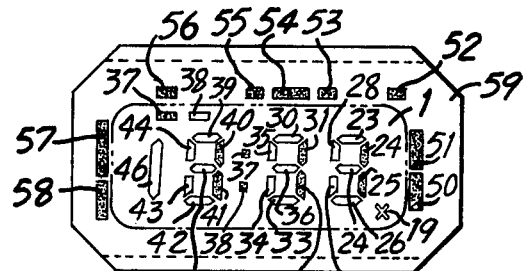
FIG. 5 shows another ECD panel according to the present invention.

FIG. 5 is a display panel showing a further refresh operation. The display panel is used for an electronic timepiece. The reference numerals 23-58 are display elements and the reference numerals 50-58 of the display elements are called dummy elements which do not function to visibly display any display information. The reference numeral 59 is a masking plate for covering the dummy electrodes 50-58 so that their colored state is not visible from outside the timepiece, and display elements 47 and 48 are used for representing "AM" and "PM".

Referring now to the dummy elements briefly, the area of the display electrodes for changing from the bleached state to the colored state is not always equal to the area of the display electrodes for changing from the colored state to the bleached state in the display operation of the electric charge transfer. Accordingly, additional electrodes have to be added to keep the display balance so that the area of the display electrodes for changing to the colored state is equal to the area of the display electrodes for changing to the bleached state. These additional electrodes are called dummy electrodes and are covered by the masking plate 59 because these electrodes do not serve as electrodes for displaying information.

The refreshing operation of the above mentioned electrochromic display is executed by refreshing the display elements and dummy elements in the colored state. During the memory period after the electric charge transfer, all of the display elements and dummy elements in the colored state are connected to the minus terminal d of the constant voltage generator 13 and the counter electrode 5 is connected to the anode of the battery 12 whereby the refresh operation is executed completely.

Figure 6:
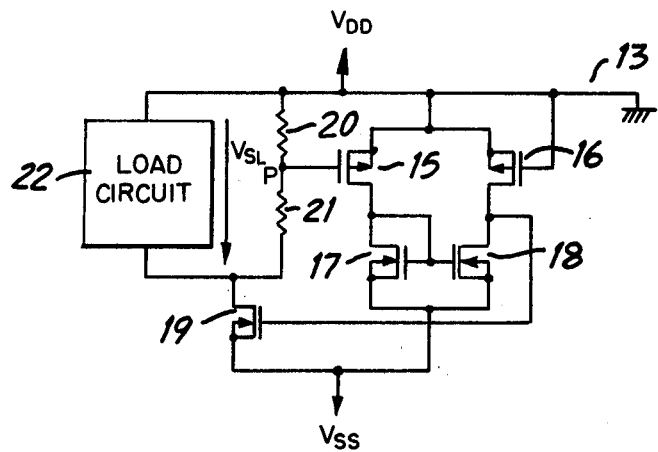
FIG. 6 shows one embodiment of a constant voltage circuit for use in the present invention.

FIG. 6 shows the constant voltage generator 13 used for the present invention. Numeral 15 designates a P channel enhancement MOSFET (referred to as PEMOS hereafter), the source of which is connected to the plus terminal of the electric source (referred to as $V_{DD}$ hereafter), the gate of which is connected to a point P, and the drain of which is connected to the drain and the gate of an N channel enhancement MOSFET 17 (referred to as NEMOS hereafter). The gate of the NEMOS 17 is connected to the gate of an NMOSFET 18 and the source is connected to the minus terminal of the power source (referred to as $V_{SS}$ hereafter).

Numeral 16 denotes a P channel depletion MOSFET (referred to as PDMOS hereafter), both the source and the gate of which are connected to $V_{DD}$, and the drain is connected to the drain of the NMOSFET 18. The source of the NMOSFET 18 is connected to $V_{SS}$. Numeral 19 denotes an NMOS, the source of which is connected to $V_{SS}$, the gate of which is connected to the drain of the NMOSFET 18 and the drain of which is connected to $V_{DD}$ via a load circuit 22. Numeral 20 denotes a resistor, one end of which is connected to $V_{DD}$, the other end of which is connected to one end of a resistor 21 via the point P, and the other end of the resistor 21 is connected to the drain of the NMOS 19.

In a above mentioned circuit construction, the load circuit 22 is an ECD.

A voltage comparator consists of the PEMOS 13, PDMOS 16, NEMOS 17 and NMOS 18, where the PEMOS 15 and the PDMOS 16 act as the input gates, and the output of which produced from the drain of the NMOS 8 controls the gate of the NMOS 19. The NMOS 19 acts as the voltage dropping MOSFET which supplies the constant voltage to the load 22 under the control of the output signal of the voltage comparator. The resistance 20 and the resistance 21 compose the constant voltage divider.

Hereinafter the circuit operation will be illustrated briefly, in which the voltage standard is $V_{DD}$.

If a terminal voltage of the load 22 is $V_{SL}$, the electric potential of the point P is represented as follows:

$$V_P = \frac{R_{20}}{R_{20} + R_{21}} V_{SL} \tag{1}$$

where
$R_{20}$; the value of the resistor 20
$R_{21}$; the value of the resistor 21
$V_P$ represented by the formula (1) is fed to the PEMOS 15 of the voltage comparator. The input voltage $V_B$ of the other input gate of PDMOS 16 is represented by the formula (2) below.

$$V_B = 0 \ldots \quad (2)$$

Although the voltage represented by the above formulas (1) and (2) are compared by the voltage comparator, the effective input voltage is corrected because of a difference in threshold voltages (referred to as $V_{TH}$ hereafter) of the two input gates, as follows:

$$V'_P = V_P - V_{TPE} \ldots \quad (1)'$$

$$V'_B = V_B - V_{TPD} \ldots \quad (2)'$$

where,
$V'_P$; effective value of the input voltage of PEMOS 15
$V'_B$; effective value of the input voltage of PDMOS 16
$V_{TPE}$; $V_{TH}$ of PEMOS 15
$V_{TPD}$; $V_{TH}$ of PDMOS 16

The NMOS 19 is controlled so as to equalize the two input voltages of the voltage comparator in the constant voltage circuit.

At this time, the constant voltage $V_{SL}$ is represented by the formulas (1), (1)' and (2)' as follows:

$$V_{SL} = \left(1 + \frac{R_{21}}{R_{20}}\right)(V_{TPE} - V_{TPD}) \quad (3)$$

As understood by the formula (3), the constant voltage can be set arbitrarily by the resistance ratio of the resistor 20 and the resistor 21, or by controlling $V_{TPE}$ and $V_{TPD}$.

Although a liquid crystal electrolyte has been illustrated as the electrolyte material contained between the substrate 1 and the substrate 4 provided with the counter electrode 5, it is to be noted that the object of the invention can also be achieved by using a solid electrolyte material.

As illustrated hereinbefore, according to the present invention:

(1) the refresh operation is always executed at a constant coloration degree since the electromotive power generated in the refresh element balances with the refresh voltage and continues refreshing until the refresh current stops; and (2) the coloration degree is arbitrarily chosen by changing the voltage level of the refreshing constant voltage.

Therefore, the deterioration of the coloration degree of the ECD caused by the electric charge transfer drive and the color shading between the display elements of the different number of transfer can be compensated correctly and reproducibly, and as a result, the ECD having excellent display quality is realized.

What is claimed is:

1. In an electrochromic display device having an electrolyte contained between two spaced-apart substrates: a set of display elements including first and second display elements disposed on the surface of at least one of the substrates and in contact with the electrolyte, each display element comprising a transparent electrode and an electrochromic layer disposed on the transparent electrode such that the display element exhibits either colored or bleached states depending on the amount of electric charge held by the display element; means for selectively applying a charge transfer voltage between preselected bleached and colored display elements to effect transfer of electric charges between the preselected display elements through the electrolyte to thereby change the display state of the electrochromic display device; a counter electrode disposed on the surface of the other substrate and in contact with the electrolyte; and compensating means for compensating for deterioration of the coloration exhibited by the colored display elements as a function of the number of times electric charge is transferred between the first and second display elements so as to maintain the degree of coloration of the colored display elements, the compensating means including voltage applying means for applying a constant voltage between the first display element and the counter electrode, the value of the constant voltage being lower than that of the charge transfer voltage, and control means for controlling the application of the constant voltage such that the constant voltage is applied before each predetermined number of transfers of electric charge held by the first display element to the second display element.

2. An electrochromic display device according to claim 1; wherein the first display element comprises a dummy display element disposed on one of the two substrates so as to be essentially non-visible from outside the electrochromic display device.

3. An alectrochromic display device according to claim 2; wherein the dummy display element is disposed on said one substrate.

4. An electrochromic display device according to claim 2; wherein the dummy display element is disposed on the other substrate.

5. An electrochromic display device according to claim 2; further including a masking member effectively covering the dummy display element so as to render the dummy display element non-visible.

6. An electrochromic display device according to claim 5; wherein the voltage applying means comprises means for applying a constant voltage of less than 1.5 volts between the first display element and the counter electrode.

7. An electrochromic display device according to claim 6; wherein the voltage applying means includes means for selectively setting the constant voltage level at a predetermined value to thereby set the degree of coloration exhibited by the display elements when in the colored state.

8. An electrochromic display device according to claim 7; wherein the means for selectively setting the constant voltage level comprises circuitry including a pair of resistors whose resistance ratio determines the values of the constant voltage level.

9. A method for compensating for color deterioration of an electrochromic display device comprised of an electrolyte held between two substrates, and a plurality of display elements which exhibit either bleached or colored states and being disposed on at least one of the substrates in contact with the electrolyte, the method comprising the steps of: selectively applying a charge transfer voltage between preselected bleached and colored display elements to effect the transfer of electric charges between the preselected display elements through the electrolyte to thereby change the display state of the electrochromic display device; and compensating for deterioration of the coloration exhibited by the colored display elements as a function of the number of times electric charge is transferred between predetermined ones of the display elements so as to maintain the degree of coloration of the colored display elements, the compensating step comprising applying a constant voltage between one of the predetermined display elements and a counter electrode disposed on the other of the substrates, and controlling the application of the constant voltage so as to apply the constant voltage before each predetermined number of transfers of electric charge held by said one predetermined display element to another of said predetermined display elements.

10. A method according to claim 9; wherein the step of applying a constant voltage comprises applying a constant negative polarity voltage to the predetermined display element which is in the colored state and applying a constant positive polarity voltage to the counter electrode.

* * * * *